Sept. 12, 1961  H. OETIKER  2,999,513
PNEUMATIC CONTROL VALVE
Filed March 31, 1959
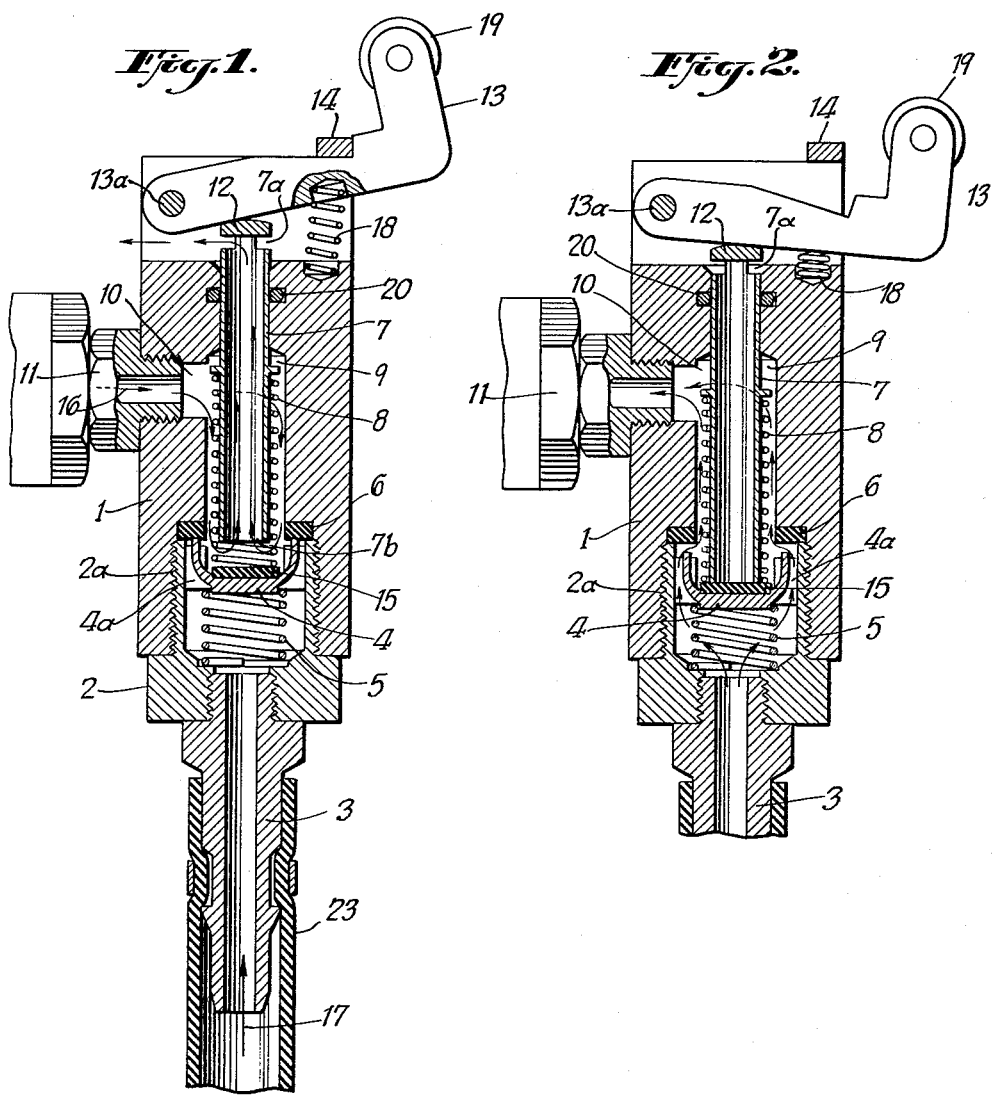
INVENTOR.
HANS OETIKER.
BY
K. A. Mayr
ATTORNEY.

United States Patent Office 2,999,513
Patented Sept. 12, 1961

2,999,513
PNEUMATIC CONTROL VALVE
Hans Oetiker, 21 Oberdorfstrasse, Horgen, Switzerland
Filed Mar. 31, 1959, Ser. No. 803,217
Claims priority, application Switzerland Mar. 31, 1958
1 Claim. (Cl. 137—620)

The present invention relates to a valve for controlling operation of a pneumatic system, particularly of a piston actuated by compressed air whereby passage of compressed air to the piston is opened according to control signals transmitted to the valve.

If a valve as referred to above closes air admission to the pneumatic piston, compressed air remains in the chamber in which the piston is located and in the pipe connection between the chamber and the valve. In the conventional arrangements this compressed air is relieved through a separate valve which is separately controlled synchronously with the main valve.

It is an object of the present invention to provide a single valve unit for controlling the operation of a pneumatic piston, the valve unit including means for automatically relieving the compressed air remaining in the piston chamber after the passage of compressed air to the piston has been closed. The arrangement according to the invention includes a main valve in the form of a check valve which is closed by a spring and by the pressure of the compressed air in the air supply conduit when no compressed air must be supplied to the piston and which is opened against the pressure of the spring and of the compressed air by a relief valve pressing against the check valve and being closed thereby. The relief valve is removed from the check valve after the latter has been closed so that the compressed air remaining downstream of the check valve can escape through the relief valve to the outside.

A further object of the invention is to provide a pneumatic control valve of the aforesaid type which is inexpensive to manufacture and to supervise and repair and which does not require a specially cast housing but whose housing is formed by a solid, oblong block, a bore longitudinally extending through the block and having three consecutive portions, one portion at one end of the block having a relatively small diameter, a portion at the opposite end of the block having a relatively large diameter and a portion between said small diameter and said large diameter portion and having an intermediate diameter.

A main object of the invention resides in the provision of a pneumatic control valve particularly for controlling the operation of a piston by air pressure, which valve has a minimum of air storage capacity interfering with the quick control action of the valve. The structure of the valve according to the invention described in the paragraph next above is particularly suited for reducing the air storage capacity of the valve and sluggishness of operation of the valve.

The novel features which are considered characteristic of the invention are set forth with particularity in the appended claim. The invention itself, however, and additional objects and advantages thereof will best be understood from the following description of an embodiment thereof when read in connection with the accompanying drawing, in which:

FIG. 1 is a longitudinal sectional view of the valve unit according to the invention in the closed or rest position.

FIG. 2 is a longitudinal sectional view of the valve shown in FIG. 1 in the open position.

Like parts are designated by like numerals in both figures.

Referring more particularly to the drawing, numeral 1 designates a housing block into which a plug 2 is screwed. A nipple 3 to which a hose conducting compressed air is connected, is screwed into the plug 2. The latter has a tubular extension 2a which presses against a washer 6 placed in the bottom of the threaded bore for the plug 2 and preferably made of rubber. Inside the tubular extension 2a is a check valve 4 which is pressed by a spring 5 against the washer 6 when the device is in rest position and the valve is closed in the direction of the flow of the compressed air. The pressure of the latter assists the spring 5 to hold the valve in tight closing position. The check valve 4 is in the shape of a cup provided with ribs 4a for axially guiding the valve in the tubular extension 2a.

A tubular air relief valve 7 is placed coaxially of the check valve inside the housing 1, a helical spring 8 being interposed between the check valve 4 and an outside collar on the valve 7 for separating and providing an air passage between the two valves. The lower end 7b of the tubular valve 7 is opposite a sealing disc 15 placed inside the cup-shaped check valve 4. The spring 8 surrounds the valve 7 and is placed in a coaxial bore 9 in the housing 1 in which bore terminates a bore 10. Into the latter a nut 11 is screwed to which a pipe is connected for delivering compressed air, for example, to the cylinder of a piston which is actuated by the compressed air.

The upper end of the valve 7 is provided with a head 12 below which air outlet slots 7a are arranged. A lever 13 pivoted at 13a to the housing 1 rests on the head 12. The lever 13 is urged against an abutment 14 by a spring 18. The spring 8 presses the valve 7 against the lever 13 whereby air can move in the direction indicated by the heavy line 16 and escape through the opening below the edge 7b of the valve 7 and through the outlets 7a when the device is in rest position. The free end of the lever 13 is provided with a roller 19 for following a cam, not shown.

The spring 8 has sufficient strength to overcome the friction between the valve 7 and the housing 1 and particularly of a packing 20. Since the spring 8 rests on the check valve 4 the spring 5 acting on the latter must be so strong that it can overcome the pressure of the spring 8 and press the valve 4 tightly onto the washer 6, even if there is no pressure in the tube 23. Upon depression of the lever 13 the valve 7 is moved downward against the disc 15 whereby escape of air through the relief valve is stopped and, upon continuous downward pressure on the valve 7, the check valve 4 is opened, as seen in FIG. 2.

The operation of the device is as follows:

The compressed air moves in the direction of the arrow 17 through the nipple 3 into the valve chamber inside the tubular extension 2a. There is no pressure in the connection 11 to a pneumatic cylinder since the latter communicates along line 16 with the atmosphere. The compressed air closes the check valve 4. When the lever 13 is pressed downward, the valve 7 is pressed against the disc 15 and closed. Upon farther depression of the lever 13 the check valve 4 is removed from its seat 6 and compressed air can flow around the check valve, as shown in FIG. 2, and through the bores 9 and 10 to a pneumatic cylinder, for example, of a pneumatic tool. If the lever 13 is released, it swings counterclockwise due to the action of the compressed air and of the spring 18. The check valve is now seated on the washer 6 and the edge 7b is lifted from the disc 15 so that air is relieved from the bore 9 and parts communicating therewith.

Relief of compressed air from the working piston of a pneumatic tool is instantaneous, if the device according to the invention is used so that the tool can operate quickly and accurately. Little force is needed for returning the work piston to its initial position because only the atmospheric pressure acts on the piston immediately after completion of the work stroke.

Excepting the time needed for filling and relieving the air supply pipe to the working cylinder there is no delay in the filling and emptying operation of the work cylinder.

In case of a double acting piston, two devices according to the invention are used. Since the air is relieved by a first device instantaneously after completion of the piston stroke in one direction, the piston can be pressed immediately in the opposite direction by actuation of the second device according to the invention.

I claim:

A quick-acting pneumatic valve comprising an oblong housing block, a bore extending longitudinally through said housing block, said bore having a small diameter portion at one end of said housing block, a large diameter portion at the opposite end of said housing block, and an intermediate diameter portion between said small diameter portion and said large diameter portion, an interior annular shoulder formed between said large diameter portion and said intermediate diameter portion for forming a valve seat, a cup-shaped check valve placed in said large diameter portion coaxially thereof and having a rim adapted to abut said shoulder, a first spring in said large diameter portion for pressing said check valve against said shoulder, said cup-shaped check valve having a cavity whose bottom forms a second valve seat, a tubular member coaxially movable in the small diameter portion and in the intermediate diameter portion of said bore and having an end extending outside of said housing block, said tubular member having a second end extending into said cavity and adapted to abut said second valve seat, a second spring interposed between said tubular member and said check valve and extending into the cavity of the latter, for urging said tubular member away from said check valve, a valve outlet in said housing block communicating with said intermediate diameter portion for conducting compressed air flowing through said check valve and through said intermediate diameter portion to said outlet upon pressing said check valve away from said first seat by means of said tubular member against the action of said first spring, and for conducting air in the opposite direction to the flow of the compressed air through said outlet, through said intermediate diameter portion and through said tubular member to the outside upon allowing removal of said tubular member from said second seat by said second spring.

References Cited in the file of this patent

UNITED STATES PATENTS

| | | |
|---|---|---|
| 1,144,758 | Desmond | June 29, 1915 |
| 2,002,630 | Eckhouse | May 28, 1935 |
| 2,534,509 | Franck | Dec. 19, 1950 |
| 2,681,076 | Osburn | June 15, 1954 |
| 2,886,055 | Davis | May 12, 1959 |

FOREIGN PATENTS

| | | |
|---|---|---|
| 190,810 | Austria | July 25, 1957 |